(12) United States Patent
Kulavik et al.

(10) Patent No.: US 11,056,131 B2
(45) Date of Patent: *Jul. 6, 2021

(54) METHOD AND SYSTEM FOR A HEADSET WITH PROFANITY FILTER

(71) Applicant: Voyetra Turtle Beach, Inc., Valhalla, NY (US)

(72) Inventors: Richard Kulavik, San Jose, CA (US); Michael A. Jessup, San Jose, CA (US)

(73) Assignee: Voyetra Turtle Beach, Inc., White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,774

(22) Filed: Apr. 10, 2019

(65) Prior Publication Data

US 2019/0237093 A1 Aug. 1, 2019

Related U.S. Application Data

(63) Continuation of application No. 15/783,111, filed on Oct. 13, 2017, now Pat. No. 10,262,679, which is a (Continued)

(51) Int. Cl.
| | |
|---|---|
| *A63F 13/87* | (2014.01) |
| *G10L 25/51* | (2013.01) |
| *H04R 1/10* | (2006.01) |
| *A63F 13/424* | (2014.01) |
| *G10L 15/00* | (2013.01) |
| *G10L 15/08* | (2006.01) |
| *G10L 25/63* | (2013.01) |

(52) U.S. Cl.
CPC ............ *G10L 25/51* (2013.01); *H04R 1/1041* (2013.01); *A63F 13/424* (2014.09); *G10L 15/00* (2013.01); *G10L 25/63* (2013.01); *G10L 2015/088* (2013.01); *H04R 1/1008* (2013.01)

(58) Field of Classification Search
CPC ......... A63F 13/424; A63F 13/87; G10L 15/00
See application file for complete search history.

(56) References Cited

U.S. PATENT DOCUMENTS

2006/0058103 A1* 3/2006 Danieli ................... A63F 13/12
463/42
2014/0007154 A1 1/2014 Seibold et al.
(Continued)

*Primary Examiner* — Thomas H Maung
(74) *Attorney, Agent, or Firm* — McAndrews, Held & Malloy

(57) ABSTRACT

A gaming headset receives a plurality of audio channels comprising game audio channels and a chat audio channel during play of a particular game. The gaming headset monitors the received audio channels for predefined words that are associated with particular sounds in a data structure, and in response to detecting predefined words, filters out at least a portion of the detected predefined words from the received plurality of audio channels. The monitoring compares sounds on the received audio channels with the particular sounds in the data structure and also performs signal analysis on the audio channels during game play to detect the occurrence of the predefined words. The filtering mutes one or more of the plurality of audio channels so that the detected occurrence of the one of the predefined words is not output via speakers of the gaming headset.

20 Claims, 13 Drawing Sheets

Related U.S. Application Data continuation of application No. 14/457,789, filed on Aug. 12, 2014, now Pat. No. 9,799,347.

(60) Provisional application No. 61/895,236, filed on Oct. 24, 2013.

(56) References Cited

U.S. PATENT DOCUMENTS

| | | | |
|---|---|---|---|
| 2014/0073429 A1 | 3/2014 | Meneses et al. | |
| 2014/0150009 A1* | 5/2014 | Sharma | H04N 21/4126 725/28 |
| 2014/0358520 A1* | 12/2014 | Davey | G10L 15/08 704/9 |

* cited by examiner

METHOD AND SYSTEM FOR A HEADSET WITH PROFANITY FILTER

CLAIM OF PRIORITY

This application is a continuation of application Ser. No. 15/783,111, filed on Oct. 13, 2017, which is a continuation of application Ser. No. 14/457,789 filed on Aug. 12, 2014, now U.S. Pat. No. 9,799,347, which claims the benefit of priority to U.S. provisional patent application 61/895,236 filed on Oct. 24, 2013 and titled "Method and System for a Headset with Profanity Filter," each of which is hereby incorporated herein by reference in its entirety.

INCORPORATION BY REFERENCE

U.S. patent application Ser. No. 13/040,144 titled "Gaming Headset with Programmable Audio" and published as US2012/0014553 is hereby incorporated herein by reference in its entirety.

TECHNICAL FIELD

Aspects of the present application relate to electronic gaming. More specifically, to methods and systems for a headset with profanity filter.

BACKGROUND

Limitations and disadvantages of conventional approaches to audio processing for gaming will become apparent to one of skill in the art, through comparison of such approaches with some aspects of the present method and system set forth in the remainder of this disclosure with reference to the drawings.

BRIEF SUMMARY

Methods and systems are provided for a headset with profanity filter, substantially as illustrated by and/or described in connection with at least one of the figures, as set forth more completely in the claims.

DETAILED DESCRIPTION

Figure 1A:
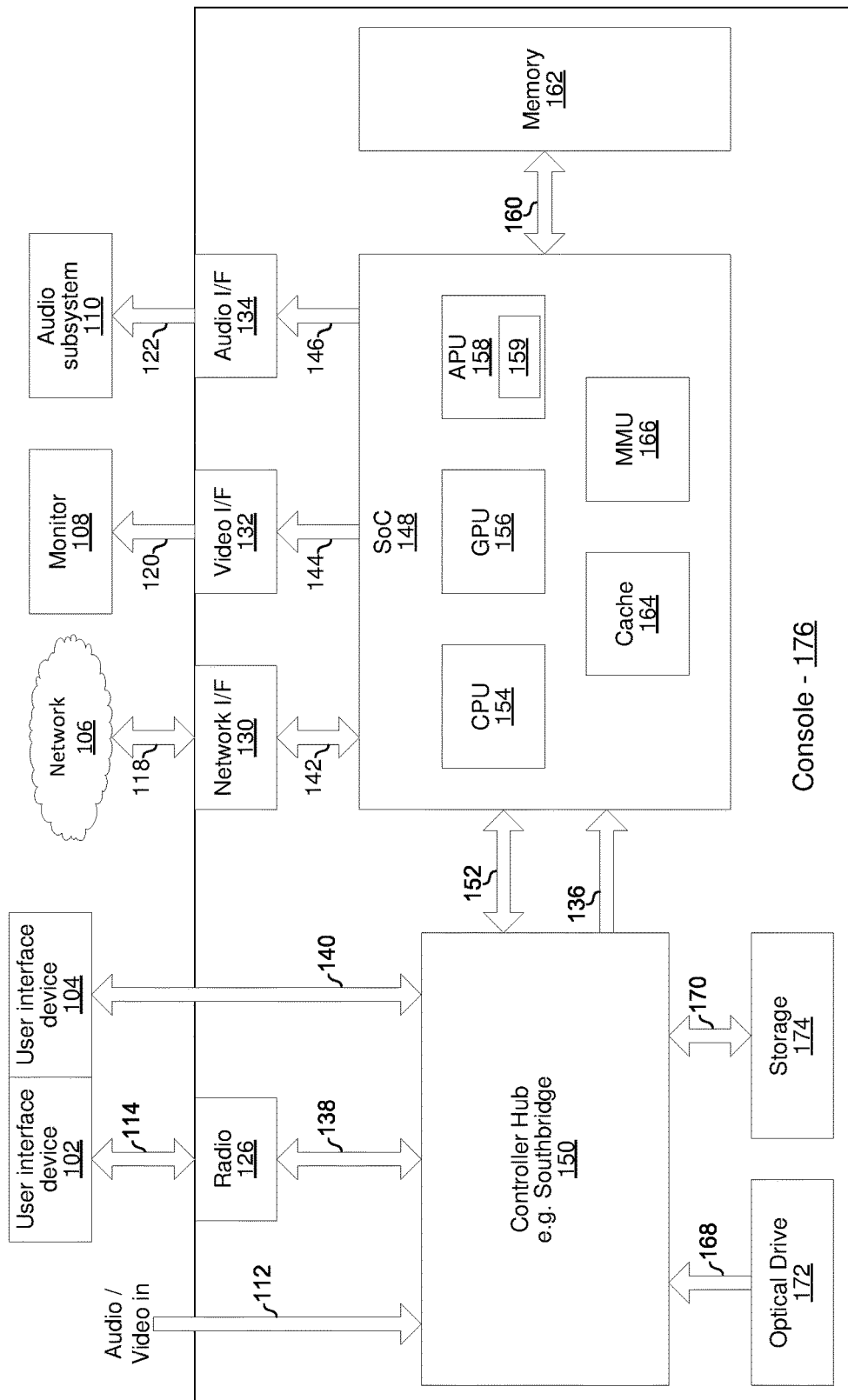
FIG. 1A is a diagram that depicts an example gaming console, which may be utilized to communicate with a gaming headset having a profanity filter, in accordance with various exemplary embodiments of the disclosure.

Certain embodiments of the disclosure may be found in a method and system for a headset with profanity filter. In accordance with various embodiments of the disclosure, a headset such as a gaming headset may receive a plurality of audio channels comprising one or more game audio channels and a chat audio channel during play of a particular game. The gaming headset may monitor the received audio channels for predefined words that are associated with particular sounds in a data structure, and in response to detecting the predefined words, the gaming headset may filter out at least a portion of the detected predefined words from the received plurality of audio channels. For the monitoring, the gaming headset may compare sounds on the received audio channels with the particular sounds in the data structure, and may also perform signal analysis on the audio channels during game play in order to detect the occurrence of the one or more predefined words. For the filtering, the gaming headset may mute one or more of the plurality of audio channels so that the detected occurrence of the one of the predefined words is not output via speakers of the gaming headset. The gaming headset may mute the chat audio channel while continuing to output the game audio channel via the speakers of the gaming headset. For the filtering, the gaming headset may replace the detected occurrence of the predefined words with predefined audio so that the detected occurrence of the predefined words is not output via speakers of the gaming headset. The gaming headset may determine a number of occurrences of the one or more predefined words in the received plurality of audio channels during a particular time period. Upon the determined number of occurrences of the predefined words during the particular time period rising above a threshold value, the gaming headset may activate a parental alert and/or an audio alert, play a warning message via speakers of the gaming headset, power down the gaming headset, and/or, communicate an alert from the headset to a second screen communication device.

Sometimes during game play, the game audio and/or chat audio associated with a playing a game, which may be referred to as game play, may comprise undesired language or words such as profane language. This profane language or words may be unsuitable for certain classes of garners based on, for example, age, maturity, moral preferences, cultural habits and/or religious beliefs. For example, parents may not want garners that are under a certain age or maturity level to hear undesired words such as profanity. In another example, garners may have religious and/or moral objections to hearing the undesired words. In the instant application, profane language may be referred to as profanity. Undesired language or words such as profanity may comprise, for example a single word, a plurality of words, a phrase, an acronym and/or one or more syllables. Accordingly, in various exemplary embodiments of the disclosure, a headset such as a gaming headset may be operable to monitor audio and filter out undesired words or profanity so that the undesired words comprising profanity are not heard by the garner that is listening to gaming headset during game play.

FIG. 1A is a diagram that depicts an example gaming console, which may be utilized to communicate with a gaming headset having a profanity filter, in accordance with various exemplary embodiments of the disclosure. Referring to FIG. 1, there is shown a console 176, user interface devices 102, 104, a monitor 108, an audio subsystem 110, and a network 106.

The game console 176 may comprise suitable logic, circuitry, interfaces and/or code that may be operable to present a game to, and also enable game play interaction between, one or more local players and/or one or more remote players. The game console 176 which may be, for example, a Windows computing device, a Unix computing device, a Linux computing device, an Apple OSX computing device, an Apple iOS computing device, an Android computing device, a Microsoft Xbox, a Sony Playstation, a Nintendo Wii, or the like. The example game console 176 comprises a radio 126, network interface 130, video interface 132, audio interface 134, controller hub 150, main system on chip (SoC) 148, memory 162, optical drive 172, and storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various buses/links 112, 138, 140, 142, 144, 146, 152, 136, 160, 168, and 170.

The controller hub 150 comprises circuitry that supports one or more data bus protocols such as High-Definition Multimedia Interface (HDMI), Universal Serial Bus (USB), Serial Advanced Technology Attachment II, III or variants thereof (SATA II, SATA III), embedded multimedia card interface (e.MMC), Peripheral Component Interconnect Express (PCIe), or the like. The controller hub 150 may also be referred to as an input/output (I/O) controller hub. Exemplary controller hubs may comprise Southbridge, Haswell, Fusion and Sandybridge. The controller hub 150 may be operable to receive audio and/or video from an external source via link 112 (e.g., HDMI), from the optical drive (e.g., Blu-Ray) 172 via link 168 (e.g., SATA II, SATA III), and/or from storage 174 (e.g., hard drive, FLASH memory, or the like) via link 170 (e.g., SATA II, III and/or e.MMC). Digital audio and/or video is output to the SoC 148 via link 136 (e.g., CEA-861-E compliant video and IEC 61937 compliant audio). The controller hub 150 exchanges data with the radio 126 via link 138 (e.g., USB), with external devices via link 140 (e.g., USB), with the storage 174 via the link 170, and with the SoC 148 via the link 152 (e.g., PCIe).

The radio 126 may comprise suitable logic, circuitry, interfaces and/or code that may be operable to communicate in accordance with one or more wireless standards such as the IEEE 802.11 family of standards, the Bluetooth family of standards, near field communication (NFC), and/or the like.

The network interface 130 may comprise suitable logic, circuitry, interfaces and/or code that may be operable to communicate in accordance with one or more wired standards and to convert between wired standards. For example, the network interface 130 may communicate with the SoC 148 via link 142 using a first standard (e.g., PCIe) and may communicate with the network 106 using a second standard (e.g., gigabit Ethernet).

The video interface 132 may comprise suitable logic, circuitry, interfaces and/or code that may be operable to communicate video in accordance with one or more wired or wireless video transmission standards. For example, the video interface 132 may receive CEA-861-E compliant video data via link 144 and encapsulate/format, etc., the video data in accordance with an HDMI standard for output to the monitor 108 via an HDMI link 120.

The audio interface 134 may comprise suitable logic, circuitry, interfaces and/or code that may be operable to communicate audio in accordance with one or more wired or wireless audio transmission standards. For example, the audio interface 134 may receive CEA-861-E compliant audio data via the link 146 and encapsulate/format, etc. the video data in accordance with an HDMI standard for output to the audio subsystem 110 via an HDMI link 122.

The central processing unit (CPU) 154 may comprise suitable logic, circuitry, interfaces and/or code that may be operable to execute instructions for controlling/coordinating the overall operation of the game console 176. Such instructions may be part of an operating system of the device 192 (FIG. 1C) and/or part of one or more software applications running on the device 192 (FIG. 1C).

The graphics processing unit (GPU) 156 may comprise suitable logic, circuitry, interfaces and/or code that may be operable to perform graphics processing functions such as compression, decompression, encoding, decoding, 3D rendering, and/or the like.

The audio processing unit (APU) 158 may comprise suitable logic, circuitry, interfaces and/or code that may be operable to perform audio processing functions such as volume/gain control, compression, decompression, encoding, decoding, surround-sound processing, and/or the like to output single channel or multi-channel (e.g., 2 channels for stereo or 5, 7, or more channels for surround sound) audio signals. The APU 158 comprises memory (e.g., volatile and/or non-volatile memory) 159 which stores parameter settings to affect processing of audio by the APU 158. For example, the parameter settings may include a first audio gain/volume setting that determines, at least in part, a volume of game audio output by the console 176 and a second audio gain/volume setting that determines, at least in part, a volume of chat audio output by the console 176. The parameter settings may be modified via a graphical user interface (GUI) of the console 176 and/or via an application programming interface (API) provided by the console 176.

The cache memory 164 may comprise suitable logic, circuitry, interfaces and/or code that may provide high-speed memory functions for use by the CPU 154, GPU 156, and/or APU 158. The cache memory 164 may typically comprise DRAM or variants thereof. The memory 162 may comprise additional memory for use by the CPU 154, GPU 156, and/or APU 158. The memory 162, typically DRAM, may operate at a slower speed than the cache memory 164 but may also be less expensive than cache memory as well as operate at a higher speed than the memory of the storage device 174. The MMU 166 controls accesses by the CPU 154, GPU 156, and/or APU 158 to the memory 162, the cache 164, and/or the storage device 174.

In FIG. 1A, the example game console 176 is communicatively coupled to the user interface device 102, the user interface device 104, the network 106, the monitor 108, and the audio subsystem 110.

Each of the user interface devices 102 and 104 may comprise, for example, a game controller, a keyboard, a motion sensor/position tracker, or the like. The user interface device 102 communicates with the game console 176 wirelessly via link 114 (e.g., Wi-Fi Direct, Bluetooth, NFC and/or the like). The user interface device 102 may be operable to communicate with the game console 176 via the wired link 140 (e.g., USB or the like).

The network 106 comprises a local area network and/or a wide area network. The game console 176 communicates with the network 106 via wired link 118 (e.g., Gigabit Ethernet).

The monitor 108 may be, for example, a LCD, OLED, or PLASMA screen. The game console 176 sends video to the monitor 108 via link 120 (e.g., HDMI).

The audio subsystem 110 may be, for example, a headset, a combination of headset and audio basestation, or a set of speakers and accompanying audio processing circuit. The game console 176 sends audio to the audio subsystem 110 via link(s) 122 (e.g., S/PDIF for digital audio or "line out" for analog audio). Additional details of an example audio subsystem 110 are described below.

In accordance with various embodiments of the disclosure, in instances where the audio subsystem 110 may comprise a headset such as a gaming headset, the gaming headset may be operable to receive a plurality of audio channels comprising game audio channels and a chat audio channel. The game audio channels and the chat audio channel may be received via the game console 176 during play of a particular game. The gaming headset may be operable to monitor the game audio channels and the chat audio channel and detect the presence of predefined words. The predefined words may be associated with particular sounds, which may be stored, for example, in a data structure in a memory device. Whenever the gaming headset detects the predefined words, the gaming headset may be operable to filter out the predefined words so that they are not output from the speakers of the gaming headset. For example, the gaming headset may be operable to detect profanity and filter out the detected profanity so that the profanity is not output from the speakers of the gaming headset and therefore not heard by the person wearing the gaming headset.

Figure 1B:
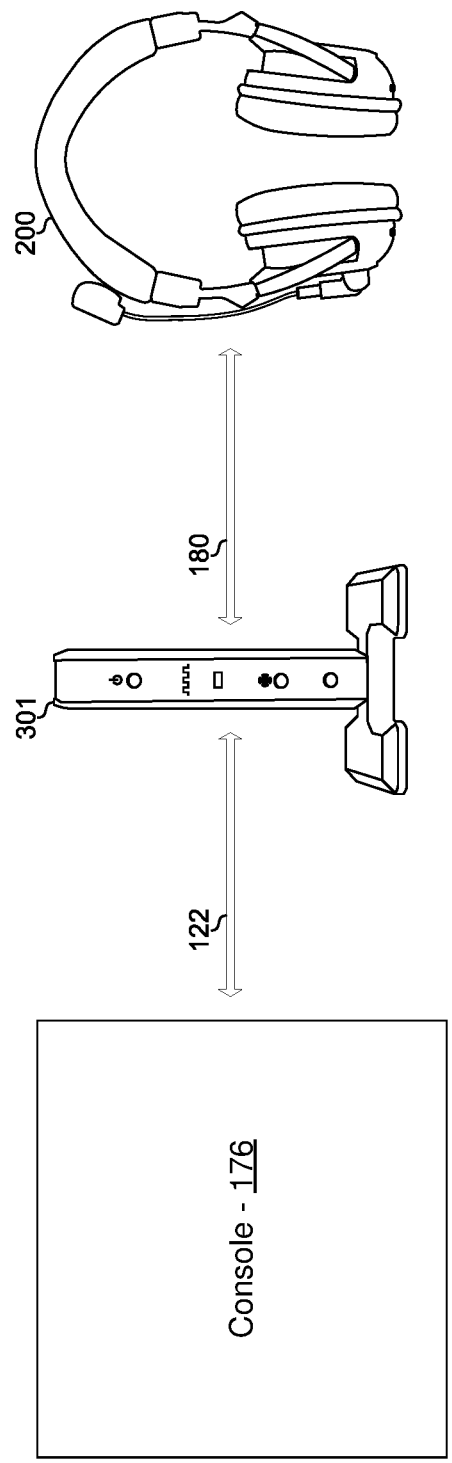
FIG. 1B is a diagram that depicts an example gaming audio subsystem comprising a headset and an audio basestation, in accordance with various exemplary embodiments of the disclosure.
Figure 1C:
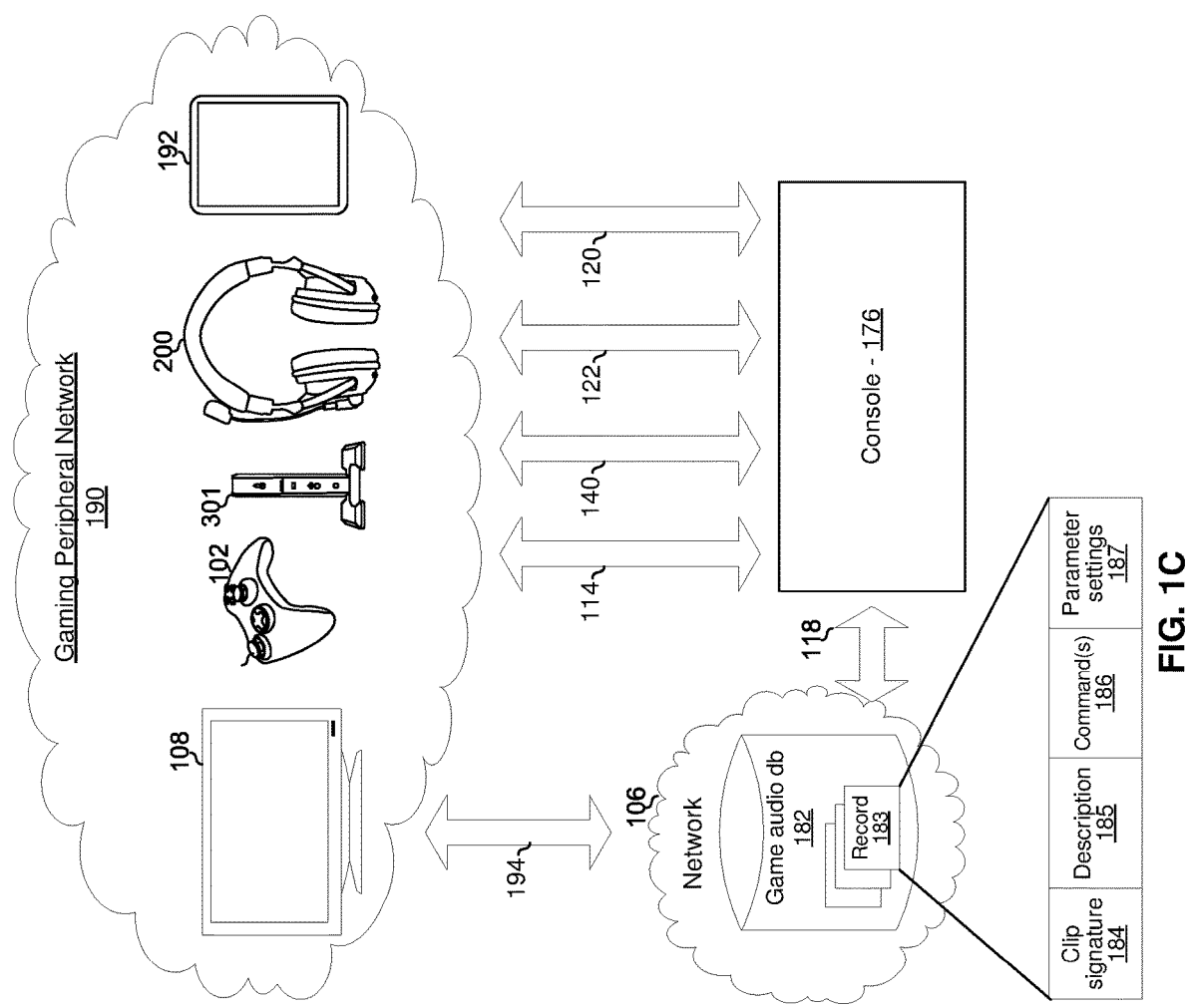
FIG. 1C is a diagram of an exemplary gaming console and an associated network of peripheral devices, in accordance with various exemplary embodiments of the disclosure.

FIG. 1B is a diagram that depicts an example gaming audio subsystem comprising a headset and an audio basestation, in accordance with various exemplary embodiments of the disclosure. Referring to FIG. 1B, there is shown a console 176, a headset 200 and an audio basestation 301. The headset 200 communicates with the basestation 301 via a link 180 and the basestation 301 communicates with the console 176 via a link 122. The link 122 may be as described above. In an example implementation, the link 180 may be a proprietary wireless link operating in an unlicensed frequency band. The headset 200 may be as described below with reference to FIGS. 2A-2C. The basestation 301 may be as described below with reference to FIGS. 3A-3B.

In operation, the headset 200 may be operable to receive game audio channels and a chat audio channel during play of a particular game. The gaming headset may be operable to monitor the game audio channels and the chat audio channel in order to determine or detect when the predefined words are being utilized on one or more audio channels of the game audio channels and the chat audio channel. The predefined words may be associated with particular sounds, which may be stored in a memory device, for example, as a data structure. Whenever the headset 200 determines or detects that the predefined words are being utilized on any of the game audio channels and the chat audio channel, the headset 200 may be operable to filter out or otherwise remove the predefined words from one or more corresponding audio channels that conveys the detected predefined words so that the predefined words are not output from the speakers of the headset 200.

FIG. 1C is a diagram of an exemplary gaming console and an associated network of peripheral devices, in accordance with various exemplary embodiments of the disclosure. Referring to FIG. 1C, there is shown is the console 176, which is communicatively coupled to a plurality of peripheral devices and a network 106. The example peripheral devices shown include a monitor 108, a user interface device 102, a headset 200, an audio basestation 301, and a multi-purpose device 192.

The monitor 108 and the user interface device 102 are as described above. The headset 200 is as described below with reference to FIGS. 2A-2C. The audio basestation is as described below with reference to, for example, FIGS. 3A-3B.

The multi-purpose device 192 may comprise, for example, a tablet computer, a smartphone, a laptop computer, or the like and that runs an operating system such as Android, Linux, Windows, iOS, OSX, or the like. An example multi-purpose device is described below with reference to FIG. 4. Hardware (e.g., a network adaptor) and software (i.e., the operating system and one or more applications loaded onto the device 192) may configure the device 192 for operating as part of the GPN 190. For example, an application running on the device 192 may cause display of a graphical user interface (GUI), which may enable a user to access gaming-related data, commands, functions, parameter settings, and so on. The graphical user interface may enable a user to interact with the console 176 and the other devices of the GPN 190 to enhance the user's gaming experience.

The peripheral devices 102, 108, 192, 200, 300 are in communication with one another via a plurality of wired and/or wireless links (represented visually by the placement of the devices in the cloud of GPN 190). Each of the peripheral devices in the gaming peripheral network (GPN) 190 may communicate with one or more others of the peripheral devices in the GPN 190 in a single-hop or multi-hop fashion. For example, the headset 200 may communicate with the basestation 301 in a single hop (e.g., over a proprietary RF link) and with the device 192 in a single hop (e.g., over a Bluetooth or Wi-Fi direct link), while the tablet may communicate with the basestation 301 in two hops via the headset 200. As another example, the user interface device 102 may communicate with the headset 200 in a single hop (e.g., over a Bluetooth or Wi-Fi direct link) and with the device 192 in a single hop (e.g., over a Bluetooth or Wi-Fi direct link), while the device 192 may communicate with the headset 200 in two hops via the user interface device 102. These example interconnections among the peripheral devices of the GPN 190 are merely examples, any number and/or types of links and/or hops among the devices of the GPN 190 is possible.

The GPN 190 may communicate with the console 176 via any one or more of the connections 114, 140, 122, and 120 described above. The GPN 190 may communicate with a network 106 via one or more links 194 each of which may be, for example, Wi-Fi, wired Ethernet, and/or the like.

A database 182 which stores gaming audio data is accessible via the network 106. The gaming audio data may comprise, for example, signatures (or "acoustic fingerprint") of particular audio clips (e.g., individual sounds or collections or sequences of sounds) that are part of the game audio of particular games, of particular levels/scenarios of particular games, particular characters of particular games, etc. In an example implementation, the database 182 may comprise a plurality of records 183, where each record 183 comprises an audio clip (or signature of the clip) 184, a description of the clip 185 (e.g., the game it is from, when it occurs in the game, etc.), one or more gaming commands 186 associated with the clip, one or more parameter settings 187 associated with the clip, and/or other data associated with the audio clip. Records 183 of the database 182 may be downloadable to, or accessed in real-time by, one of more devices of the GPN 190.

Figure 2A:
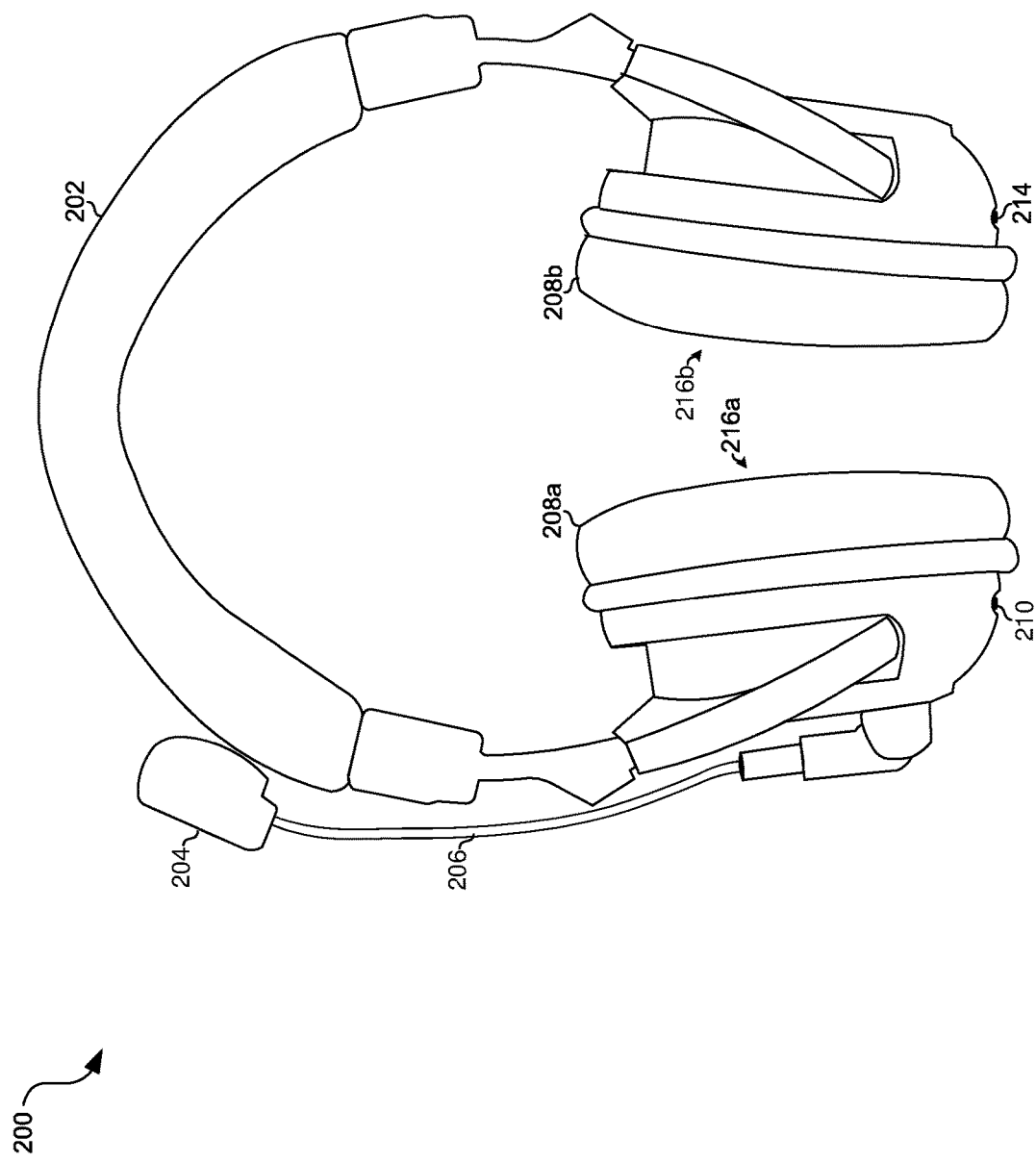
FIGS. 2A and 2B are diagrams that depict two views of an example embodiment of a gaming headset, in accordance with various exemplary embodiments of the disclosure.
Figure 2B:
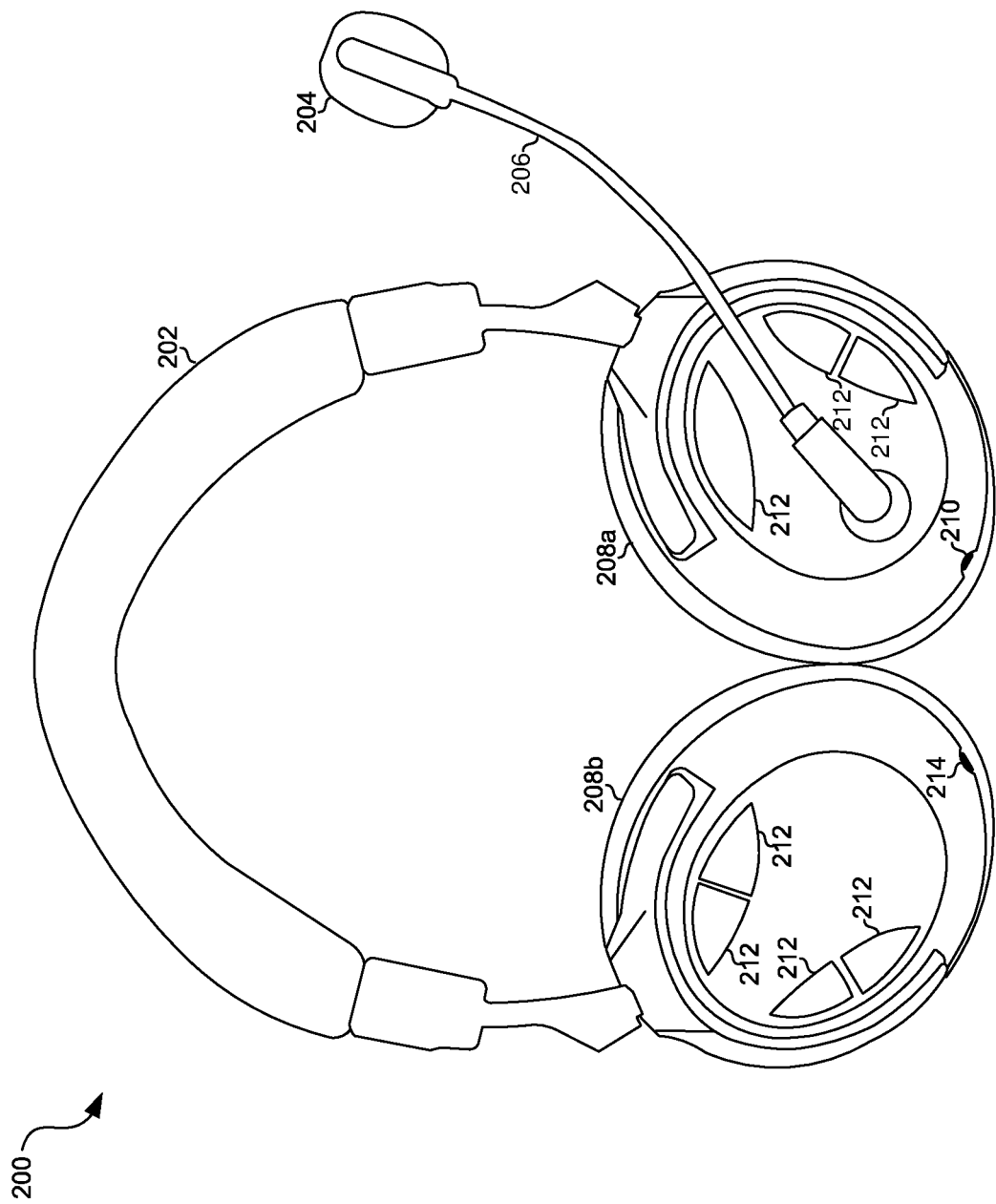

FIGS. 2A and 2B are diagrams that depict two views of an example embodiment of a game headset, in accordance with various exemplary embodiments of the disclosure. Referring to FIGS. 2A and 2B, there are shown two views of an example headset 200 that may present audio output by a gaming console such as the console 176. The headset 200 comprises a headband 202, a microphone boom 206 with microphone 204, ear cups 208a and 208b which surround speakers 216a and 216b, connector 210, connector 214, and user controls 212.

The connector 210 may be, for example, a 3.5 mm headphone socket for receiving analog audio signals (e.g., receiving chat audio via an Xbox "talkback" cable).

The microphone 204 may comprise suitable logic, circuitry, interfaces and/or code that may be operable to convert acoustic waves (e.g., the voice of the person wearing the headset) to electric signals for processing by circuitry of the headset and/or for output to a device (e.g., console 176, basestation 301, a smartphone, and/or the like) that is in communication with the headset.

The speakers 216a and 216b may comprise circuitry that may be operable to convert electrical signals to sound waves.

The user controls 212 may comprise dedicated and/or programmable buttons, switches, sliders, wheels, etc. for performing various functions. Example functions which the controls 212 may be configured to perform include: power the headset 200 on/off, mute/unmute the microphone 204, control gain/volume of, and/or effects applied to, chat audio by the audio processing circuit of the headset 200, control gain/volume of, and/or effects applied to, game audio by the audio processing circuit of the headset 200, enable/disable/initiate pairing (e.g., via Bluetooth, Wi-Fi direct, NFC, or the like) with another computing device, and/or the like. Some of the user controls 212 may adaptively and/or dynamically change during gameplay based on a particular game that is being played. Some of the user controls 212 may also adaptively and/or dynamically change during gameplay based on a particular player that is engaged in the game play. The connector 214 may be, for example, a USB, thunderbolt, Firewire or other type of port or interface. The connector 214 may be used for downloading data to the headset 200 from another computing device and/or uploading data from the headset 200 to another computing device. Such data may include, for example, parameter settings (described below). Additionally, or alternatively, the connector 214 may be used for communicating with another computing device such as a smartphone, tablet compute, laptop computer, or the like.

Figure 2C:
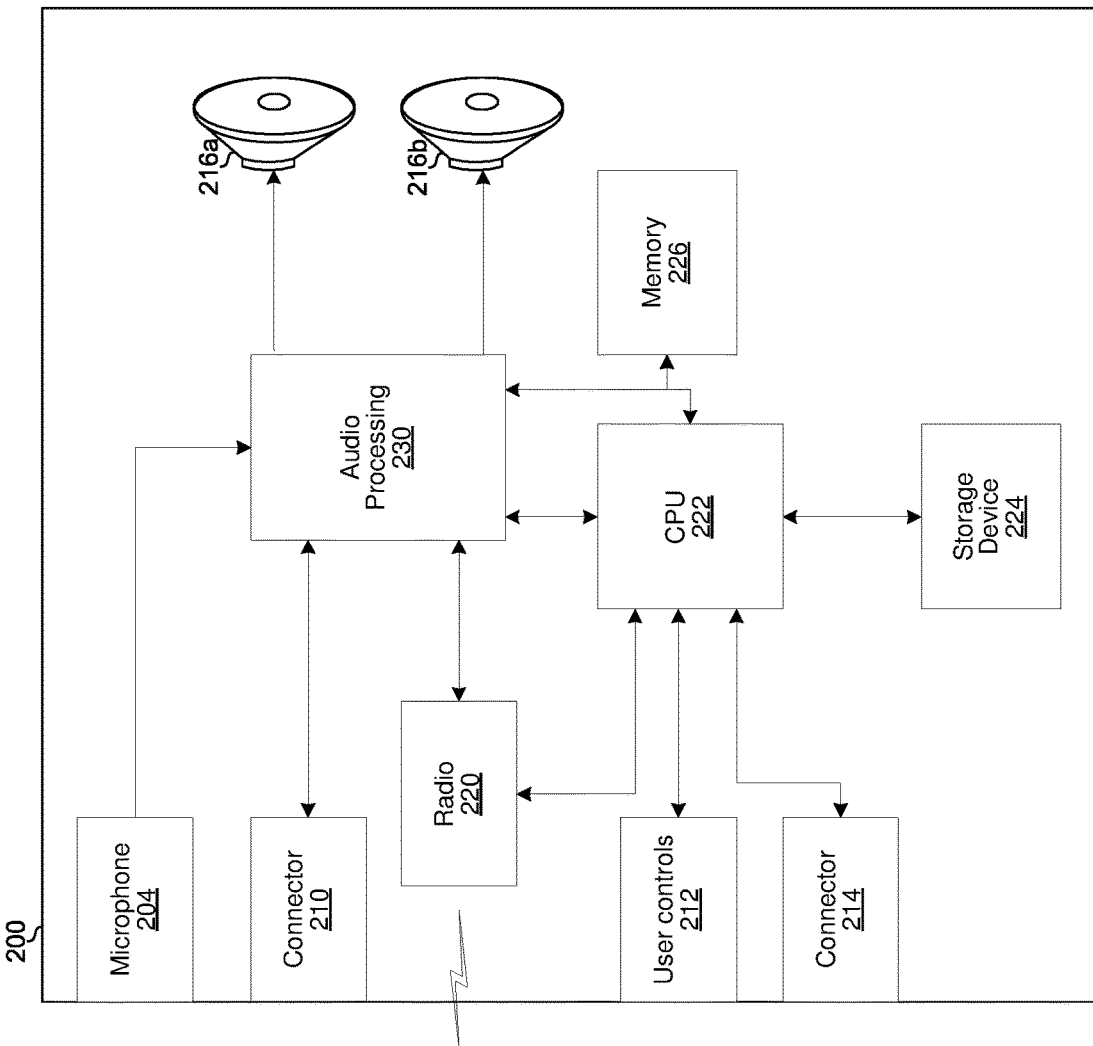
FIG. 2C is a diagram that depicts a block diagram of the example headset of FIGS. 2A and 2B, in accordance with various exemplary embodiments of the disclosure.

FIG. 2C is a diagram that depicts a block diagram of the example headset of FIGS. 2A and 2B, in accordance with various exemplary embodiments of the disclosure. Referring to FIG. 2C, there is shown a headset 200. In addition to the connector 210, user controls 212, connector 214, microphone 204, and speakers 216a and 216b already discussed, shown are a radio 220, a CPU 222, a storage device 224, a memory 226, and an audio processing circuit 230.

The radio 220 may comprise suitable logic, circuitry, interfaces and/or code that may be operable to communicate in accordance with one or more standardized (such as, for example, the IEEE 802.11 family of standards, NFC, the Bluetooth family of standards, and/or the like) and/or proprietary wireless protocol(s) (e.g., a proprietary protocol for receiving audio from an audio basestation such as the basestation 301).

The CPU 222 may comprise suitable logic, circuitry, interfaces and/or code that may be operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The CPU 222 may also be operable to handle filtering or removal of predefined words, for example, profanity for the headset 200 based on analysis of game and/or chat audio received from the console 176 during game play. In this regard, the CPU 222 may be operable to dynamically handle the filtering or removal of the predefined words for the headset 200 based on information that may be received from the audio processing circuit 230 and/or information that may be stored in the storage device 224 or an external storage device.

The storage device 224 may comprise suitable logic, circuitry, interfaces and/or code that may comprise, for example, FLASH or other nonvolatile memory, which may be operable to store data comprising operating data, configuration data, settings, and so on, which may be used by the CPU 222 and/or the audio processing circuit 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuit 230. As another example, one or more parameter settings may determine, at least in part, a frequency response of one or more filters that operate on audio signals in the audio processing circuit 230. As another example, one or more parameter settings may determine, at least in part, whether and which sound effects are added to audio signals in the audio processing circuit 230 (e.g., which effects to add to microphone audio to morph the user's voice). Example parameter settings which affect audio processing are described in the co-pending U.S. patent application Ser. No. 13/040,144 titled "Game headset with Programmable Audio" and published as US2012/0014553, the entirety of which is hereby incorporated herein by reference. Particular parameter settings may be selected autonomously by the headset 200 in accordance with one or more algorithms, based on user input (e.g., via controls 212), and/or based on input received via one or more of the connectors 210 and 214.

The storage device 224 may also be operable to store audio information resulting from analysis of the plurality of game audio channels and/or chat audio channel during game play. In one embodiment of the disclosure, the headset 200 may be operable to download the audio information for a particular game from a sounds database in an external storage device and store the downloaded audio information in the storage device 224. The external storage device may be located at a remote server (e.g., database 182 in FIG. 1C) or may be an external memory device, for example. In this regard, the CPU 222 may be operable to configure the radio 220 to download the audio information for the particular game. The audio information may comprise sounds that correspond to the predefined words for the particular game. Upon subsequent play of that particular game, the headset 200 does not need to download the audio information for that particular game from the sounds database but may instead acquire the audio information for that particular game from the storage 224. The CPU 222 may be operable to ensure that any updates to the sounds database may be downloaded from the sounds database and saved in the storage device 224 to ensure that the audio information for the particular game is kept up-to-date.

In another embodiment of the disclosure, the CPU 222 may be operable to configure the audio processing circuit 230 to perform signal analysis on the plurality of audio channels that are received via the connector 210 and/or the radio 220. The CPU 222 may be enabled to control the operation of the audio processing circuit 230 in order to store the results of the audio analysis along with, for example, an identifier of the game in the storage device 224. The CPU 222 may be enabled to monitor the plurality of game audio channels and/or the chat audio channel that are received via the connector 210 and detect the characteristics of one or more sounds. Based on the detected sounds, the CPU 222 may be operable to determine when the detected sounds match one or more predefined words. The CPU 222 may be operable to filter out or otherwise remove the one or more predefined words so that the predefined words are not output from the speakers 216a and 216b in the headset 200.

In an exemplary embodiment of the disclosure, audio information for a particular game may be stored in a lookup table (LUT) in the storage device 224. In this regard, the LUT may comprise an identity of the game, audio information corresponding to a detected sound and predefined words that may be mapped to the detected sounds. In instances when a sound is detected on a monitored channel, the CPU 222 may compare the detected sound to the audio information that is stored in the storage device 224. If the comparison results in a match between the detected sound and the stored audio information, the corresponding sound may be filtered from the game audio channel and/or the chat audio channel that conveys the predefined word. In this regard, the predefined word that is detected on the game audio channel and/or the chat audio channel is not output from the speakers 216a and 216b in the headset 200. Accordingly, the predefined word is not heard by the person wearing the headset 200.

The memory 226 may comprise suitable logic, circuitry, interfaces and/or code that may comprise volatile memory used by the CPU 222 and/or audio processing circuit 230 as program memory, for storing runtime data, and so on. In this regard, the memory 226 may comprise information and/or data that may be utilized to control operation of the audio processing circuit 230 to perform signal analysis on the plurality of received audio channels comprising the game audio channels and/or the chat audio channel. The signal analysis may be utilized to determine whether the characteristics of one or more sounds on the game audio channels and/or the chat audio channel matches predefined words that are stored in the memory 226.

The audio processing circuit 230 may comprise suitable logic, circuitry, interfaces and/or code that may be operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 230 may be determined, at least in part, by which parameter settings have been selected. The processing performed by the audio processing circuit 230 may also be determined based on default settings, player preference, and/or by adaptive and/or dynamic changes to the game play environment. The processing may be performed on game, chat, and/or microphone audio that is subsequently output to speaker 216a and 216b. Additionally, or alternatively, the processing may be performed on chat audio that is subsequently output to the connector 210 and/or radio 220.

The audio processing circuit 230 may be operable to perform signal analysis on received audio signals that are conveyed by a plurality of game audio channels and the chat audio channel. In this regard, the audio processing circuit 230 may be operable to analyze the audio on each of the plurality of received game audio channels and/or chat audio channel in order to detect the characteristics of sounds corresponding to the audio signals. In an exemplary embodiment of the disclosure, the audio processing circuit 230 may be operable to analyze the audio on each of the plurality of received game audio channels and/or chat audio channel in order to detect a unique signature that may be associated with a certain sound that may be mapped to a predefined word. For example, the certain sound may be mapped to a profane or curse word.

Based on the signal analysis by the audio processing circuit 230, the CPU 222 may determine that a sound detected on one of the game audio channels and chat audio channel matches the certain sound for a predefined word. For example, the CPU 222 may compare the detected sound (or a signature or "acoustic fingerprint" of the detected sound) to that audio information that is stored in the storage device 224 (e.g., signatures or acoustic fingerprints of known sounds stored in the storage device 224). If the comparison results in a match between the detected sound and the stored audio information associated with one or more predefined words, the CPU 222 may filter out or mute the game audio channel and/or chat audio channel that conveys the predefined words so that the predefined words is not output from the speakers 216a and 216b in the headset 200.

In an exemplary embodiment of the disclosure, the audio processing circuit 230 may be operable to monitor the game audio and/or chat audio in order to detect sounds in the game audio and/or chat audio that corresponds to certain sounds that are associated with the predefined words. The CPU 222 may be operable to match the sounds that are detected in the game audio and/or chat audio with sounds that are stored in the storage 324, which are representative of the predefined words. In instances when the CPU 222 determines that a sound that is detected in the game audio and/or chat audio matches a predefined word, the CPU 222 may be operable to configure the audio processing circuit 230 to filter out the sound that corresponds to the predefined word in the game audio and/or chat audio. In this regard, the speakers 216a and 216b in the headset 200 does not output the sound that corresponds to the predefined word and the wearer of the headset 200 does not hear the predefined word.

Figure 3A:
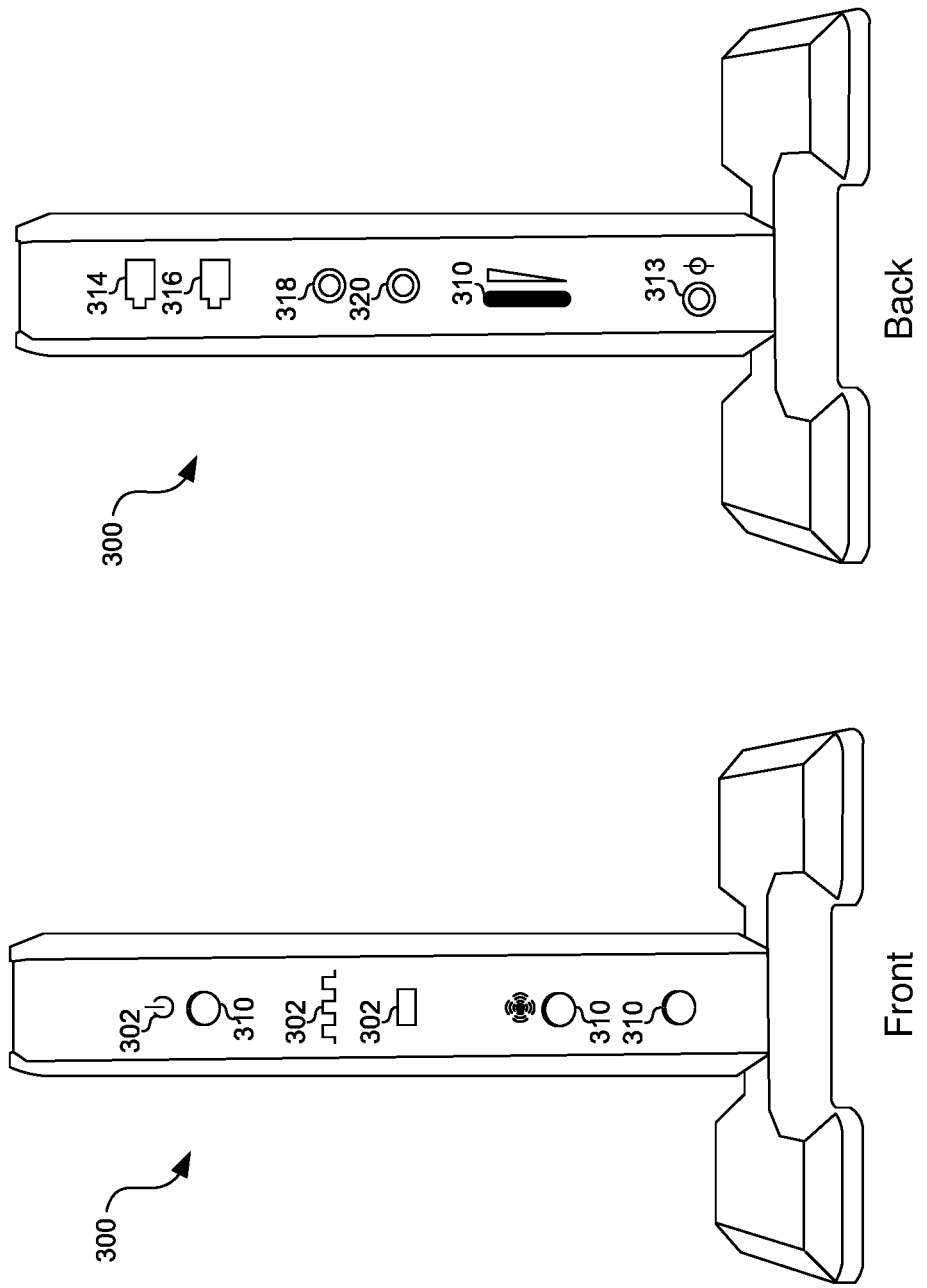
FIG. 3A is a diagram that depicts two views of an example embodiment of an audio basestation, in accordance with various exemplary embodiments of the disclosure.

FIG. 3A is a diagram that depicts two views of an example embodiment of an audio basestation, in accordance with various exemplary embodiments of the disclosure. Referring to FIG. 3A, there is shown an exemplary embodiment of an audio basestation 301. The basestation 301 comprises status indicators 302, user controls 310, power port 313, and audio connectors 314, 316, 318, and 320.

The audio connectors 314 and 316 may comprise digital audio in and digital audio out (e.g., S/PDIF) connectors, respectively. The audio connectors 318 and 320 may comprise a left "line in" and a right "line in" connector, respectively. The controls 310 may comprise, for example, a power button, a button for enabling/disabling virtual surround sound, a button for adjusting the perceived angles of the speakers when the virtual surround sound is enabled, and a dial for controlling a volume/gain of the audio received via the "line in" connectors 318 and 320. The status indicators 302 may indicate, for example, whether the audio basestation 301 is powered on, whether audio data is being received by the basestation 301 via connectors 314, and/or what type of audio data (e.g., Dolby Digital) is being received by the basestation 301.

Figure 3B:
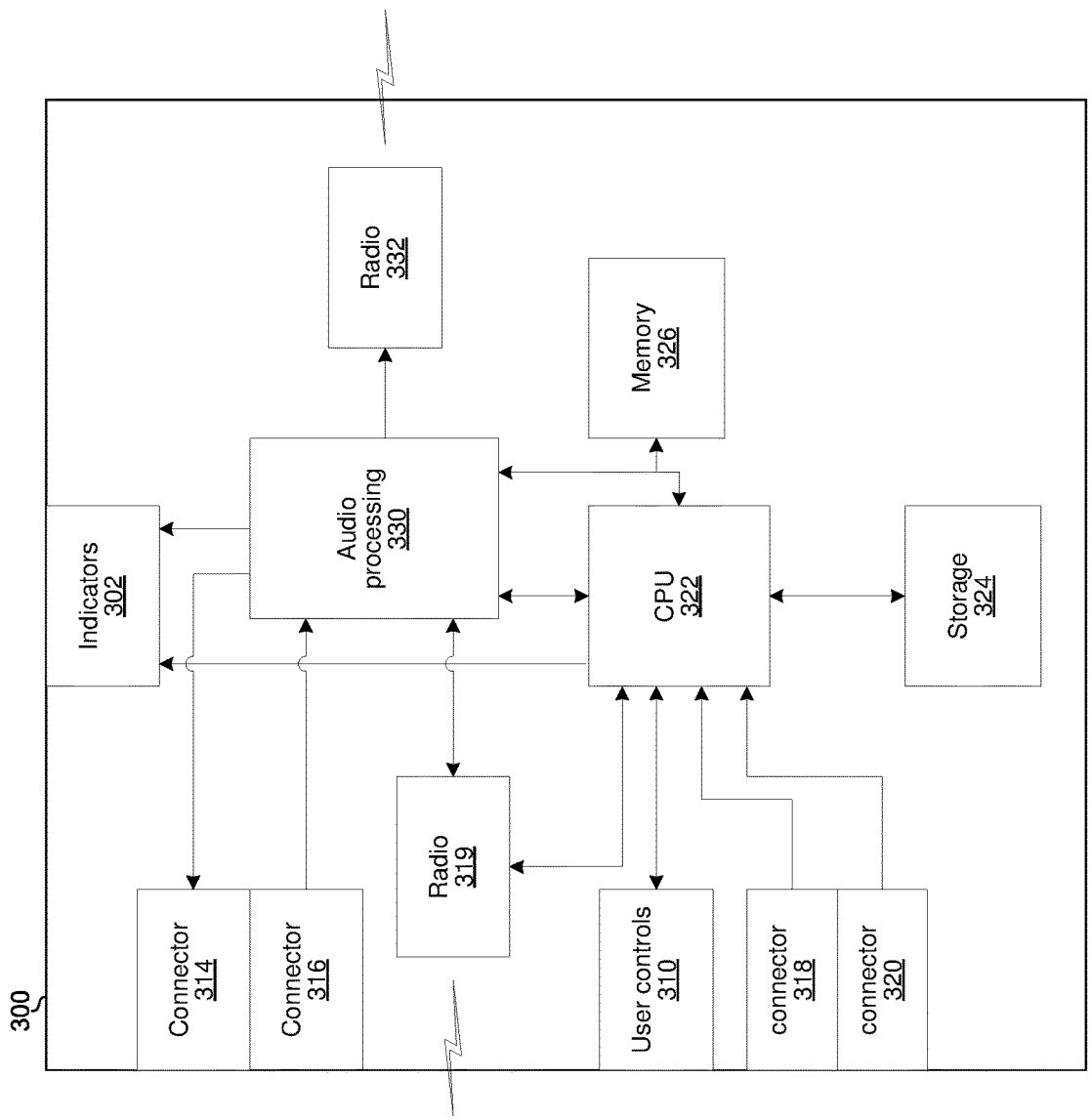
FIG. 3B is a diagram that depicts a block diagram of the audio basestation, in accordance with various exemplary embodiments of the disclosure.

FIG. 3B is a diagram that depicts a block diagram of the audio basestation 301, in accordance with various exemplary embodiments of the disclosure. Referring to FIG. 3B, there is shown an exemplary embodiment of an audio basestation 301. In addition to the user controls 310, indicators 302, and connectors 314, 316, 318, and 320 described above, the block diagram additionally shows a CPU 322, a storage device 324, a memory 326, a radio 319, an audio processing circuit 330, and a radio 332.

The radio 319 comprises suitable logic, circuitry, interfaces and/or code that may be operable to communicate in accordance with one or more standardized (such as the IEEE 802.11 family of standards, the Bluetooth family of standards, NFC, and/or the like) and/or proprietary (e.g., proprietary protocol for receiving audio protocols for receiving audio from a console such as the console 176) wireless protocols.

The radio 332 comprises suitable logic, circuitry, interfaces and/or code that may be operable to communicate in accordance with one or more standardized (such as, for example, the IEEE 802.11 family of standards, the Bluetooth family of standards, and/or the like) and/or proprietary wireless protocol(s) (e.g., a proprietary protocol for transmitting audio to the headphones 200).

The CPU 322 comprises suitable logic, circuitry, interfaces and/or code that may be operable to execute instructions for controlling/coordinating the overall operation of the audio basestation 301. Such instructions may be part of an operating system or state machine of the audio basestation 301 and/or part of one or more software applications running on the audio basestation 301. In some implementations, the CPU 322 may be, for example, a programmable interrupt controller, a state machine, or the like.

The storage 324 may comprise, for example, FLASH or other nonvolatile memory for storing data which may be used by the CPU 322 and/or the audio processing circuit 330. Such data may include, for example, parameter settings that affect processing of audio signals in the basestation 301. For example, one or more parameter settings may determine, at least in part, a gain of one or more gain elements of the audio processing circuit 330. As another example, one or more parameter settings may determine, at least in part, a frequency response of one or more filters that operate on audio signals in the audio processing circuit 330. As another example, one or more parameter settings may determine, at least in part, whether and which sound effects are added to audio signals in the audio processing circuit 330 (e.g., which effects to add to microphone audio to morph the user's voice). Example parameter settings which affect audio processing are described in the co-pending U.S. patent application Ser. No. 13/040,144 titled "Game headset with Programmable Audio" and published as US2012/0014553, the entirety of which is hereby incorporated herein by reference. Particular parameter settings may be selected autonomously by the basestation 301 in accordance with one or more algorithms, based on user input (e.g., via controls 310), and/or based on input received via one or more of the connectors 314, 316, 318, and 320.

The memory 326 may comprise volatile memory used by the CPU 322 and/or audio processing circuit 330 as program memory, for storing runtime data, etc.

The audio processing circuit 330 may comprise suitable logic, circuitry, interfaces and/or code that may be operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 330 may be determined, at least in part, by which parameter settings have been selected. The processing may be performed on game and/or chat audio signals that are subsequently output to a device (e.g., headset 200) in communication with the basestation 301. Additionally, or alternatively, the processing may be performed on a microphone audio signal that is subsequently output to a device (e.g., console 176) in communication with the basestation 301.

Figure 4:
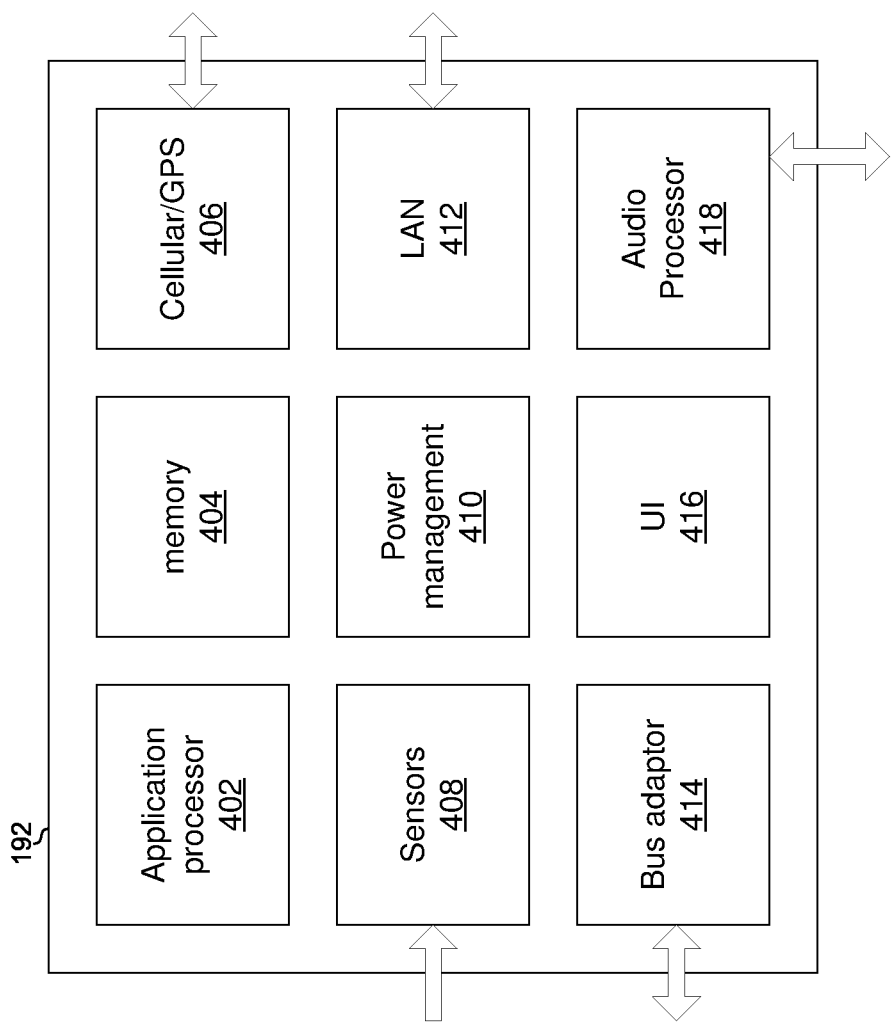
FIG. 4 is a block diagram of an exemplary multi-purpose device, in accordance with various exemplary embodiments of the disclosure.

FIG. 4 is a block diagram of an exemplary multi-purpose device 192, in accordance with various exemplary embodiments of the disclosure. The example multi-purpose device 192 comprises an application processor 402, memory subsystem 404, a cellular/GPS networking subsystem 406, sensors 408, power management subsystem 410, LAN subsystem 412, bus adaptor 414, user interface subsystem 416, and audio processor 418.

The application processor 402 comprises suitable logic, circuitry, interfaces and/or code that may be operable to execute instructions for controlling/coordinating the overall operation of the multi-purpose device 192 as well as graphics processing functions of the multi-purpose device 1922. Such instructions may be part of an operating system of the console and/or part of one or more software applications running on the console.

The memory subsystem 404 comprises volatile memory for storing runtime data, nonvolatile memory for mass storage and long-term storage, and/or a memory controller which controls reads/writes to memory.

The LAN subsystem 412 comprises suitable logic, circuitry, interfaces and/or code that may be operable to perform baseband processing and analog/RF processing for transmission and reception of wired, optical, and/or wireless signals (e.g., in accordance with Wi-Fi (IEEE 802.11 and variants thereof 802.11 e.g., a, b, g, n, ac, q, Wi-Fi Direct, etc), Bluetooth, Ethernet, and/or other standards).

The sensors 408 comprise, for example, a camera, a gyroscope, an accelerometer, a biometric sensor, and/or the like.

The power management subsystem 410 comprises suitable logic, circuitry, interfaces and/or code that may be operable to manage distribution of power among the various components of the multi-purpose device 192.

The cellular/GPS networking subsystem 406 comprises suitable logic, circuitry, interfaces and/or code that may be operable to perform baseband processing and analog/RF processing for transmission and reception of cellular and GPS signals.

The bus adaptor 414 comprises suitable logic, circuitry, interfaces and/or code that may be operable for interfacing one or more internal data busses of the multi-purpose device with an external bus (e.g., a Universal Serial Bus) for transferring data to/from the multi-purpose device via a wired connection.

The user interface subsystem 416 comprises suitable logic, circuitry, interfaces and/or code that may be operable to control and relay signals to/from a touchscreen, hard buttons, and/or other input devices of the multi-purpose device 192.

The audio processor 418 comprises suitable logic, circuitry, interfaces and/or code that may be operable to process (e.g., digital-to-analog conversion, analog-to-digital conversion, compression, decompression, encryption, decryption, resampling, etc.) audio signals. The audio processor 418 may be operable to receive and/or output signals via a connector such as a 3.5 mm stereo and microphone connector.

Figure 5:
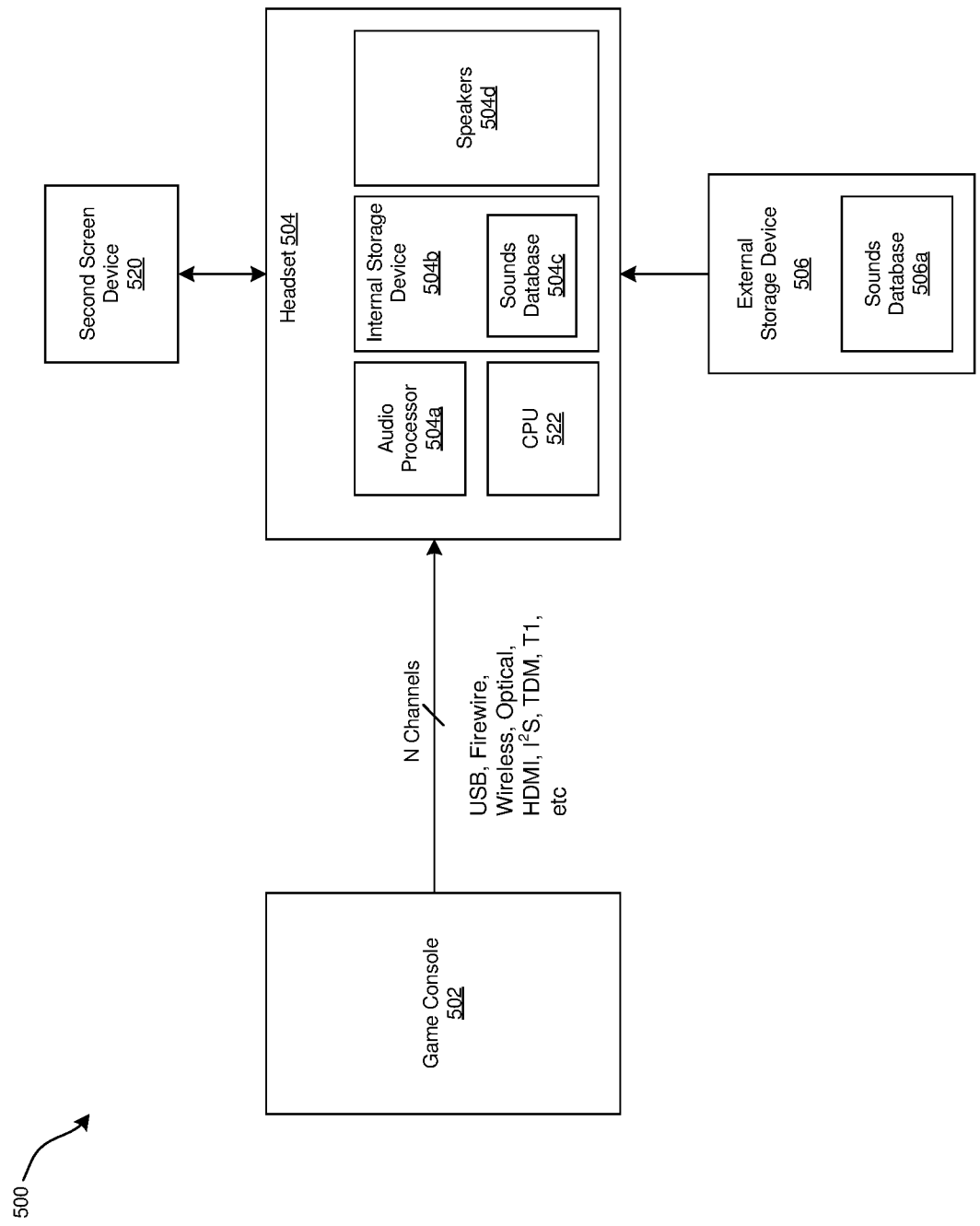
FIG. 5 is a block diagram illustrating an exemplary subsystem that may be utilized for filtering out predefined words during game play, in accordance with an exemplary embodiment of the disclosure.

FIG. 5 is a block diagram illustrating an exemplary subsystem that may be utilized for filtering out predefined words during game play, in accordance with an embodiment of the disclosure. Referring to FIG. 5, there is shown a subsystem 500 comprising a game console 502, a headset 504, and an external storage device 506. The headset 504 may comprise an audio processor 504a, an internal storage device 504b, speakers 504d and a CPU 522. The internal storage device 504b may comprise a sounds database 504c. The external storage device 506 may comprise a sounds database 506a. FIG. 5 also shows a second screen communication device 520.

The game console 502 may comprise suitable logic, circuitry, interfaces and/or code that may be operable to present a game to, and also enable game play interaction between, one or more local players and/or one or more remote players. The game console 502 may be substantially similar to the game console 176, for example, which is shown and described with respect to FIG. 1A. The game console 502 may be operable to generate output video signals for a game over a video channel and output corresponding audio signals for the game over one or more of a plurality of audio channels. Exemplary audio channels may comprise a center (CTR) channel, a front right (FR) channel, a front left (FL) channel, a rear right (RR) channel, a rear left (RL) channel, a side right (SR) channel, and a side left (SL) channel. The game console 502 may also enable game chat over a chat audio channel.

The headset 504 may comprise suitable logic, circuitry, interfaces and/or code that may be operable to receive the plurality of audio channels of game audio and/or chat audio. The headset 504 may be substantially similar to the headset 200, for example, which is shown and described with respect to FIGS. 2A, 2B and 2C. The headset 504 may be operable to monitor the audio channels in order to detect characteristics of the sounds on the monitored audio channels. In instances where the characteristics of a particular sound that is detected on the monitored audio channels matches the sound associated with a predefined word, the headset 504 may be muted or otherwise prevented from outputting the predefined word.

The speakers 504d may be substantially similar to the speakers 216a and 216b, for example, which are shown and described with respect to FIGS. 2A, 2B and 2C.

The external storage device 506 may comprise one or more suitable devices having suitable logic, circuitry, interfaces and/or code that may be operable to store audio information for a game. The audio information may be stored in, for example, the sounds database 506a. The audio information may comprise an audio signature or "acoustic fingerprint" of a predefined word.

The audio processor 504a may comprise suitable logic, circuitry, interfaces and/or code that may be operable to monitor the plurality of audio channels of the game and/or chat audio. The audio processor 504a may be substantially similar to the audio processing circuit 230, which is shown and described with respect to FIG. 1A. The audio processor 504a may be operable to utilize signal analysis to detect the characteristics of sounds in the monitored plurality of audio channels. For example, the audio processor may be operable to detect sounds based on an audio signature or "acoustic fingerprint" of a predefined word.

The internal storage device 504b may comprise one or more suitable devices that may comprise suitable logic, circuitry, interfaces and/or code that may be operable to store audio information for a game. The audio information may comprise an audio signature or "acoustic fingerprint" of a predefined word.

The internal storage device 504b may be substantially similar to the storage device 224, for example, which is shown and described with respect to FIG. 2C. The audio information may be stored in, for example, the sounds database 504c. Audio information for a particular game may be downloaded from the sounds database 506a, which is in the external storage device 506, by the headset 504 via, for example, a wireless connection. The downloaded audio information may be stored in the sounds database 504c, which is in the internal storage device 504b. The audio information may be retrieved from the internal storage device 504b when a game is initiated.

The CPU 522 may comprise suitable logic, circuitry, interfaces and/or code that may be operable to execute instructions for controlling, managing and/or coordinating the overall operation of the headset 504. In this regard, the CPU 222 may be operable to control, manage and coordinate operation of the components in the headset 504, which comprises the audio processor 504a, the internal storage device 504b, and the sounds database 504c. The CPU 522 may also be operable to coordinate and manage operations between the headset 504, the game console 502, and the external storage device 506. The CPU 522 may also be operable to coordinate and manage operations for the sounds database 504c and the sounds database 506a. The CPU 522 may be substantially similar to the CPU 222, which is shown and described with respect to, for example, FIG. 2C.

The second screen communication device 520 may comprise suitable logic, circuitry, interfaces and/or code that may be operable to receive warning messages from the headset 504. For example, when the number of occurrences of the predefined words occur within a particular time period and is greater than a threshold value, the second screen communication device 520 may be operable to receive an alert and/or message that may be communicated from the headset 504.

In operation, the audio processing circuit 504a may be operable to monitor the plurality of received game audio channels and/or a game chat channel from the game console 502. In this regard, the audio processing circuit 504a may be operable to perform signal analysis on each of the plurality of received game audio channels and/or the chat audio channel to detect the characteristics of sounds carried in one or more of the game audio channels and/or the chat audio channel. Based on the signal analysis by the audio processing circuit 504a, the CPU 522 may be operable to compare the sounds that are detected in one or more of the game audio channels and/or the chat audio channel. If the CPU 522 determines that a particular detected sound matches a sound for a predefined word that is stored in the sounds database 504c, the CPU 522 may instruct the audio processing circuit 504a to filter out the predefined word from the corresponding game audio channels and/or the chat audio channel. Accordingly, the predefined word is not output from the speakers 504d of the headset 504. In accordance with various embodiments of the disclosure, the audio processing circuit 504a and/or the CPU 522 in the headset 504 may be operable to filter out a detected predefined word by replacing the sound for the detected predefined word in the game audio channel and/or chat audio channel with other predefined audio such as one or more tones. The filtering may replace the detected occurrence of the predefined words with predefined audio so that the detected occurrence of the predefined words is not output via speakers of the headset 504. For example, the audio processing circuit 504a and/or the CPU 522 in the headset 504 may be operable to detect profanity such as a curse word and filter out the curse word so that the curse word is not output from the speakers 504d in the headset 504.

In accordance with various embodiments of the disclosure, the audio processing circuit 504a and/or the CPU 522 in the headset 504 may be operable to determine which of the plurality of game audio channels and/or chat audio channel conveys the detected predefined word. The audio processing circuit 504a in the headset 504 may be operable to mute the game audio channel and/or the chat audio channel that conveys the detected predefined word. In some embodiments of the disclosure, when the detected predefined word is on the chat audio, the audio processing circuit 504a in the headset 504 may be operable to mute the chat audio while continuing to output the game audio. Similarly, when the detected predefined word is on a game audio channel, the audio processing circuit 504a in the headset 504 may be operable to mute that game audio channel while continuing to output other game audio channels and/or the chat audio channel. Accordingly, the predefined word is not output from the speakers 504d of the headset 504.

The CPU 522 may also be operable to determine the number of times that the one or more predefined words occur in the game audio channels and/or chat audio channel during a particular time period. In some embodiments of the disclosure, in instances when the determined number of occurrences of the predefined words occur within a particular time period rises above a threshold value, the headset 504 may be operable to perform one or more actions. Exemplary actions that may be performed may comprise activating a parental alert and/or an audio alert, playing a warning message via speakers of the headset 504, powering down the headset 504, and/or, communicating an alert from the headset 504 to the second screen communication device 520.

Figure 6:
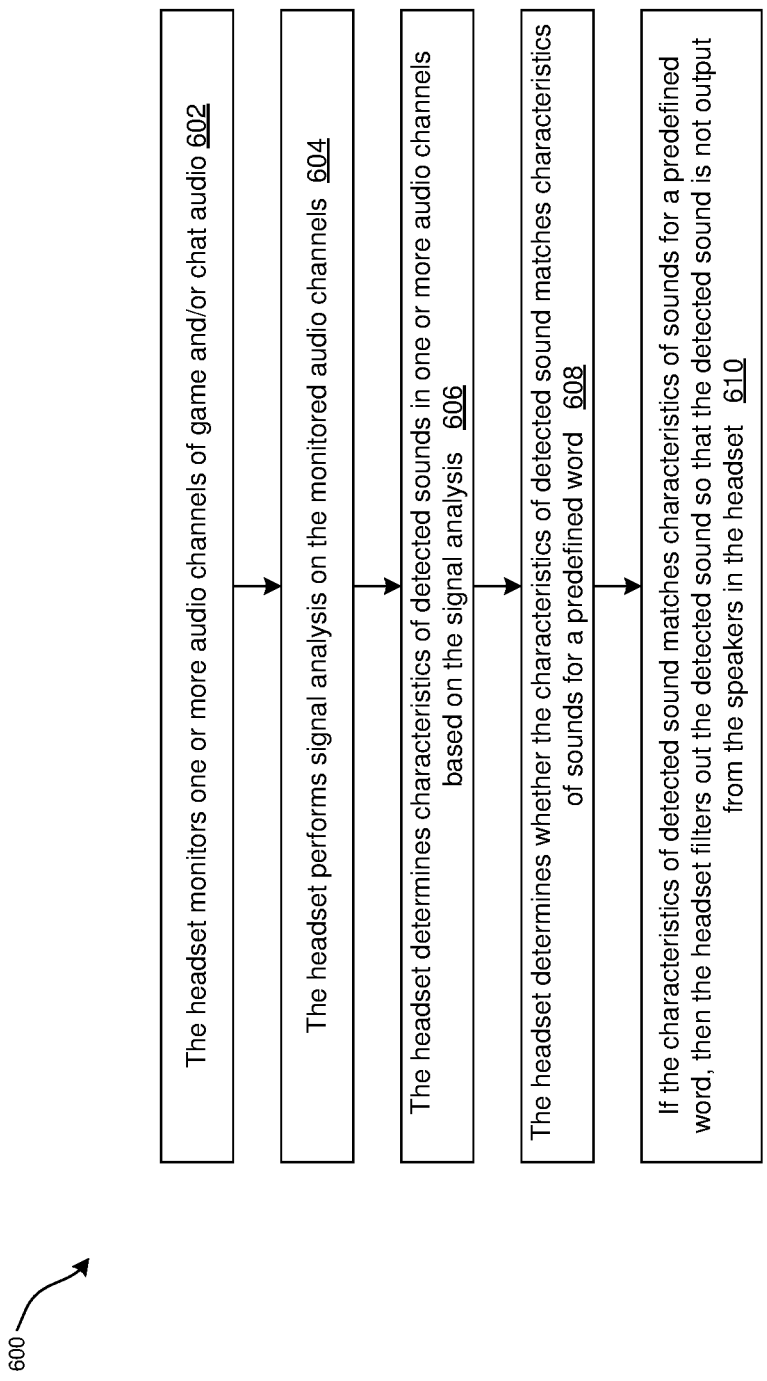
FIG. 6 is a flow diagram illustrating exemplary steps for filtering out predefined words during game play, in accordance with various exemplary embodiments of the disclosure.

FIG. 6 is a flow diagram illustrating exemplary steps for filtering out predefined words during game play, in accordance with various exemplary embodiments of the disclosure. Referring to FIG. 6, there is shown a flow chart 600 comprising a plurality of exemplary steps, namely, 602 through 610. In step 602, the headset 504 may be operable to monitor one or more audio channels of game and/or chat audio. In step 604, the headset 504 may be operable to perform signal analysis on the monitored audio channels. In step 606, the headset 504 may be operable to determine characteristics of the detected sounds on the one or more audio channels based on the signal analysis. In step 608, the headset 504 may be operable to determine whether the characteristics of detected sound match characteristics of sounds for a predefined word. In step 610, if the characteristics of the detected sound match characteristics of the sounds for a predefined word, then the headset filters out the detected sound so that the detected sound is not output from the speakers 504d in the headset 504.

Figure 7:
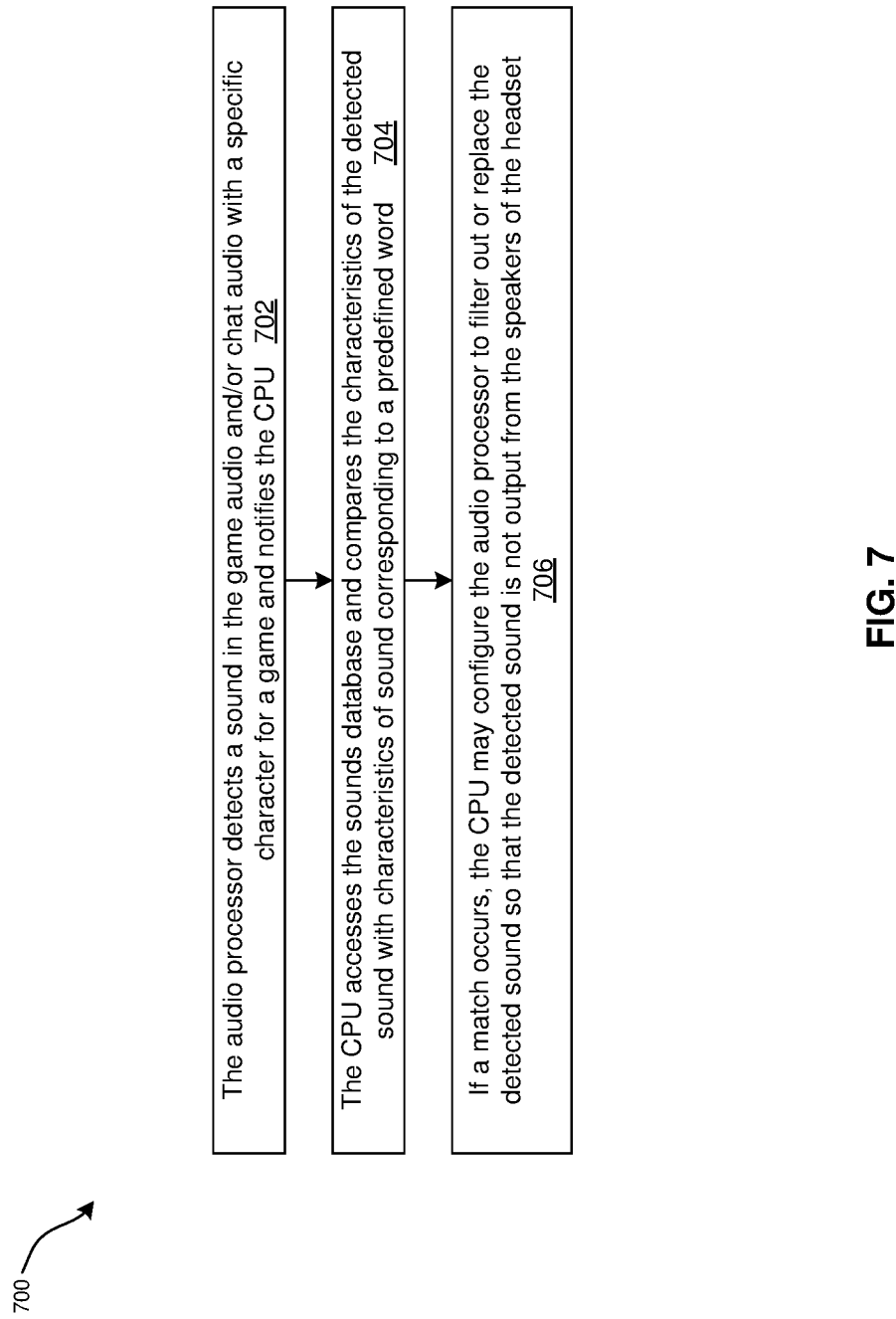
FIG. 7 is a flow diagram illustrating exemplary steps for generating audio alerts in a headset, in accordance with various exemplary embodiments of the disclosure.

FIG. 7 is a flow diagram illustrating exemplary steps for filtering out predefined words during game play, in accordance with various exemplary embodiments of the disclosure. Referring to FIG. 7, there is shown a flow chart 700 comprising a plurality of exemplary steps, namely, 702 through 706. In step 702, the audio processor 504a detects a sound in the game audio and/or chat audio with specific characteristics for a game and notifies the CPU 522. In step 704, the CPU 522 accesses the sounds database 504c and compares the characteristics of the detected sound with characteristics of sound corresponding to a predefined word. In step 706, the CPU 522 may configure the audio processor 504a to filter out or replace the detected sound so that the detected sound is not output from the speakers 504d of the headset 504.

Figure 8:
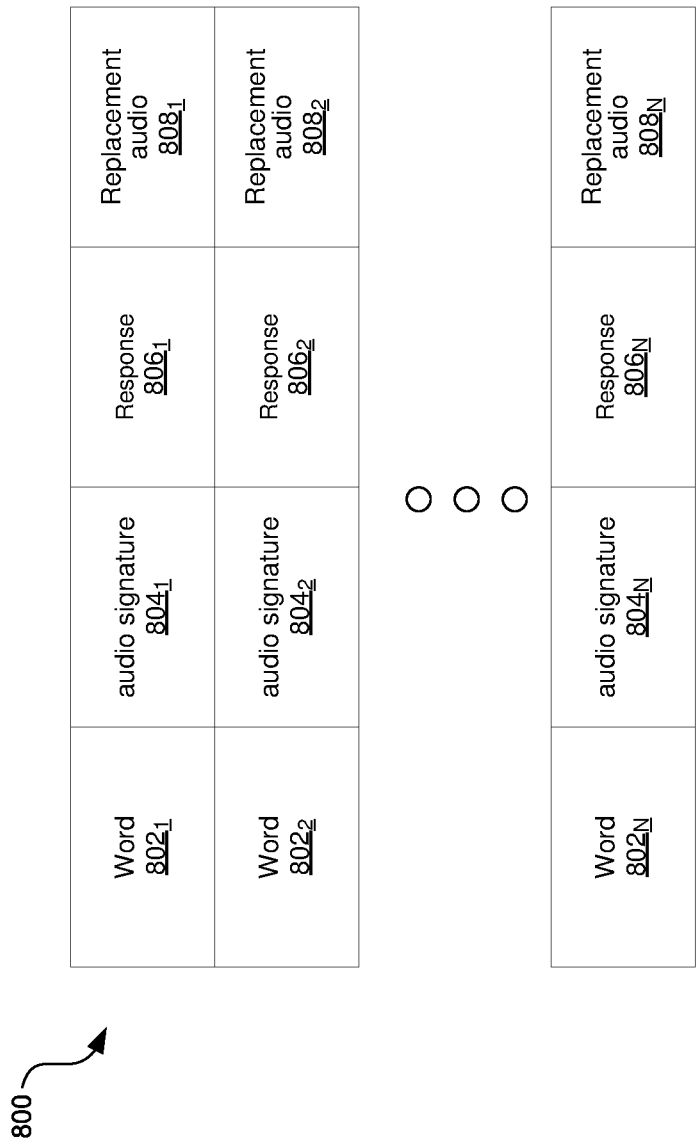
FIG. 8 depicts example entries of a data structure used by a headset for profanity filtering.

FIG. 8 depicts example entries of a data structure used by a headset for profanity filtering. The data structure 800 may be, for example, part of database 504c and/or 504a. Each entry of the data structure 800 corresponds to a predefined word for which the headset is to monitor in game, chat, and/or microphone audio. Each entry comprises, for example, a word field 802, an audio signature field 804, a response field 806, and a replacement audio field 808. In an example implementation, the data structure 800 may be customized for a particular game and/or a particular player. The customization may comprise, for example, an administrator using a graphical user interface (e.g., running on a device 520 that is coupled to the headset 500) to populate the fields of the data structure 800. For example, a parent may set up a first data structure for his/her youngest child and a second data structure for his/her oldest child. The two data structures may be different in the words or phrases for which there are entries and/or where the two data structures have common words or phrases, the entries may differ in the corresponding signatures, responses, and/or replacement audio.

The word field 802 may store the text of the $i^{th}$ word or phrase. The field 804 may store the audio signature for which the audio may be monitored to detect an occurrence of the $i^{th}$ word or phrase. The audio signature 804$_i$ may be selected based on a player associated with the data structure and/or a game associated with the data structure 800 to account for the fact that the same word or phrase may have a different signature depending on a source of the word or phrase (e.g., whether the local player spoke it, whether a remote player spoke it, whether it was part of the game audio, etc.). The response field 806$_i$ may store instructions to be executed upon detecting an occurrence of the $i^{th}$ word or phrase in the audio. For example, the response field 806$_i$ may instruct the headset to replace the audio corresponding to the detected word in 802$_i$ with the replacement audio 808$_i$. The replacement audio 808$_i$ may be selected based on a player associated with the data structure and/or a game associated with the data structure 800 such that the replacement audio 808$_i$ has similar tone, pitch, and/or intensity as the audio it is replacing. For example, where audio signature 804$_i$ corresponds to a clip of profane game audio, the replacement audio 808$_i$ may be a previously-recorded non-profane clip from the same game audio. As another example, where audio signature 804$_i$ corresponds to a particular user speaking a profanity, the replacement audio 808$_i$ may be a previously-recorded non-profane clip from the same user.

In accordance with an exemplary embodiment of the disclosure, a gaming headset such as the headset 200 may be operable to receive a plurality of audio channels during play of a particular game. The plurality of audio channels may comprise game audio channels and a chat audio channel. The headset 200 may be operable to monitor the received plurality of audio channels for one or more predefined words. In response to detecting an occurrence of one or more of the predefined words, the headset 200 may be operable to filter out at least a portion of the detected one or more of the predefined words from the received plurality of audio channels. The predefined words may be associated with one or more particular sounds in a data structure. During the monitoring, the headset 200 may be operable to compare sounds on the received plurality of audio channels with the one or more particular sounds in the data structure. During the filtering, the headset 200 may be operable to mute one or more of the plurality of audio channels so that the detected occurrence of the one or more of the predefined words is not output via speakers of the gaming headset. The headset 200 may be operable to mute the chat audio channel while continuing to output the game audio channel via the speakers of the gaming headset.

During the filtering, the headset 200 may be operable to replace the detected occurrence of the one or more predefined words with predefined audio so that the detected occurrence of the one or more predefined words is not output via speakers of the gaming headset. The headset 200 may be operable to determine a number of occurrences of the one or more predefined words in the received plurality of audio channels during a particular time period. When the determined number of occurrences of the one or more predefined words during the particular time period rises above a threshold value, the headset 200 may be operable to activate a parental alert, activate an audio alert, play a warning message via speakers of the gaming headset, power down the gaming headset and/or communicate an alert from the headset to a second screen communication device. The headset 200 may be operable to determine a source of the detected occurrence of the predefined words. When the source of the detected occurrence of the predefined word is the chat audio channel, the headset 200 is operable to mute the chat audio channel while continuing to output the game audio channel via the speakers of the gaming headset. The headset 200 may be operable to perform signal analysis on the plurality of audio channels during the play of the particular game for the detecting of the occurrence of the predefined words.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within a transmitter and/or a receiver may be configured or reconfigured based on, for example, current, recently received and/or updated signals, information and/or data.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:
    in a gaming headset that receives a plurality of audio channels during play of a game, wherein said plurality of audio channels comprises game audio channels and a chat audio channel:
    downloading audio information for a particular game to said gaming headset from a sounds database in an external storage device, said audio information comprising signatures that correspond to one or more predefined words;

monitoring each of said received plurality of audio channels for signatures associated with the one or more predefined words;

comparing said signatures from the monitored plurality of audio channels to said downloaded signatures, said downloaded signatures being selected for the comparing based on a particular game and player of the particular game;

detecting an occurrence of one of said one or more predefined words based on said comparison;

determining in which audio channel of said plurality of audio channels said occurrence of said one of said one or more predefined words is detected; and in response to detecting said occurrence of said one of said one or more predefined words, filtering out at least a portion of said detected one of said one or more predefined words from said determined audio channel while continuing to output other of said plurality of audio channels via speakers of said gaming headset.

2. The method according to claim 1, wherein said one or more predefined words are associated with one or more particular sounds in a data structure.

3. The method according to claim 2, wherein said monitoring comprises comparing sounds on said received plurality of audio channels with said one or more particular sounds in said data structure.

4. The method according to claim 1, wherein said filtering comprises muting one or more of said plurality of audio channels so that said detected occurrence of said one of said one or more predefined words is not output via said speakers of said gaming headset.

5. The method according to claim 4, comprising muting said chat audio channel while continuing to output said game audio channels via said speakers of said gaming headset.

6. The method according to claim 1, wherein said predefined audio comprises one or more tones so that said detected occurrence of said one of said one or more predefined words is not output via said speakers of said gaming headset.

7. The method according to claim 1, comprising determining a number of occurrences of said one or more predefined words in said received plurality of audio channels during a particular time period.

8. The method according to claim 7, comprising upon said determined number of occurrences of said one or more predefined words during said particular time period rising above a threshold value, performing one or more of:
activating a parental alert;
activating an audio alert;
playing a warning message via speakers of said gaming headset;
powering down said gaming headset; and/or
communicating an alert from said headset to a second screen communication device.

9. The method according to claim 7, comprising:
determining a source of said determined number of occurrences of said one or more predefined words; and
if said source of said detected occurrences of said one or more predefined words is said chat audio channel, muting said chat audio channel while continuing to output said game audio channels via said speakers of said gaming headset.

10. The method according to claim 1, wherein said monitoring comprises performing signal analysis on said plurality of audio channels during said play of said particular game for said detecting of said occurrence of said one of said one or more predefined words.

11. A system, comprising:
a gaming headset that receives a plurality of audio channels during play of a game, wherein said plurality of audio channels comprises game audio channels and a chat audio channel, said gaming headset is operable to:
download audio information for a particular game to said gaming headset from a sounds database in an external storage device, said audio information comprising signatures that correspond to one or more predefined words;
monitor each of said received plurality of audio channels for signatures associated with the one or more predefined words;
compare said signatures from the monitored plurality of audio channels to said downloaded signatures, said downloaded signatures being selected for the comparing based on a particular game and/or player of the particular game;
detect an occurrence of one of said one or more predefined words;
determine in which audio channel of said plurality of audio channels said occurrence of said one of said one or more predefined words is detected; and
in response to detecting said occurrence of said one of said one or more predefined words, filter out at least a portion of said detected one of said one or more predefined words from said determined audio channel while continuing to output other of said plurality of audio channels via speakers of said gaming headset.

12. The system according to claim 11, wherein said one or more predefined words are associated with one or more particular sounds in a data structure.

13. The system according to claim 12, wherein said monitoring:
compares sounds on said received plurality of audio channels with said one or more particular sounds in said data structure; and
performs signal analysis on said plurality of audio channels during said play of said particular game for said detecting of said occurrence of said one of said one or more predefined words.

14. The system according to claim 11, wherein said filtering mutes one or more of said plurality of audio channels so that said detected occurrence of said one of said one or more predefined words is not output via speakers of said gaming headset.

15. The system according to claim 14, wherein said gaming headset is operable to mute said chat audio channel while continuing to output said game audio channels via said speakers of said gaming headset.

16. The system according to claim 11, wherein said predefined audio comprises one or more tones so that said detected occurrence of said one of said one or more predefined words is not output via said speakers of said gaming headset.

17. The system according to claim 11, wherein said gaming headset is operable to determine a number of occurrences of said one or more predefined words in said received plurality of audio channels during a particular time period.

18. The system according to claim 17, wherein upon said determined number of occurrences of said one or more predefined words during said particular time period rising above a threshold value, said gaming headset is operable to perform one or more of:

activate a parental alert;
activate an audio alert;
play a warning message via speakers of said gaming headset;
power down said gaming headset; and/or
communicate an alert from said headset to a second screen communication device.

19. The system according to claim 17, wherein said gaming headset is operable to:
  determine a source of said determined number occurrences of said one or more predefined words; and
  if said source of said detected occurrences of said one or more predefined words is said chat audio channel, mute said chat audio channel while continuing to output said game audio channels via speakers of said gaming headset.

20. A non-transitory computer readable medium having stored thereon, a computer program having at least one code section that is executable by a machine for causing the machine to perform steps comprising:
  in a gaming headset that receives a plurality of audio channels during play of a game, wherein said plurality of audio channels comprises game audio channels and a chat audio channel:
  downloading audio information for a particular game to said gaming headset from a sounds database in an external storage device, said audio information comprising signatures that correspond to one or more predefined words;
  monitoring each of said received plurality of audio channels for signatures associated with the one or more predefined words;
  comparing said signatures from the monitored plurality of audio channels to said downloaded signatures, said downloaded signatures being selected for the comparing based on a particular game and/or player of the particular game;
  detecting an occurrence of one of said one or more predefined words based on said comparison;
  determining in which audio channel of said plurality of audio channels said occurrence of said one of said one or more predefined words is detected; and
  in response to detecting said occurrence of said one of said one or more predefined words, filtering out at least a portion of said detected one of said one or more predefined words from said determined audio channel while continuing to output other of said plurality of audio channels via speakers of said gaming headset.

* * * * *